US008613389B2

(12) United States Patent
Payne

(10) Patent No.: US 8,613,389 B2
(45) Date of Patent: Dec. 24, 2013

(54) METHOD OF PACKAGING FINANCIAL TRANSACTION INSTRUMENTS, PARTICULARLY STORED VALUE CARDS

(75) Inventor: Anthony L. Payne, Gainesville, VA (US)

(73) Assignee: Oberthur Technologies, Colombes (FR)

( * ) Notice: Subject to any disclaimer, the term of this patent is extended or adjusted under 35 U.S.C. 154(b) by 1126 days.

(21) Appl. No.: 11/863,697

(22) Filed: Sep. 28, 2007

(65) Prior Publication Data
US 2009/0084839 A1 Apr. 2, 2009

(51) Int. Cl.
*G06K 5/00* (2006.01)
*G06K 7/00* (2006.01)
*G06K 19/00* (2006.01)

(52) U.S. Cl.
USPC .............................. 235/380; 235/487; 235/486

(58) Field of Classification Search
USPC ......... 235/493, 375, 380, 392, 382, 379, 486, 235/487; 209/552, 583
See application file for complete search history.

(56) References Cited

U.S. PATENT DOCUMENTS

| 4,343,129 A * | 8/1982 | Gunther et al. ............... 53/206 |
| 5,388,815 A * | 2/1995 | Hill et al. ...................... 270/32 |
| 5,409,441 A * | 4/1995 | Muscoplat .................... 493/223 |
| 5,918,909 A * | 7/1999 | Fiala et al. ...................... 283/61 |
| 6,431,453 B1 * | 8/2002 | Hill et al. ...................... 235/475 |
| 6,719,198 B2 * | 4/2004 | Bretl et al. .................... 235/380 |
| 6,957,737 B1 * | 10/2005 | Frederickson et al. ....... 206/449 |
| 7,083,086 B2 * | 8/2006 | Whitaker ...................... 235/380 |
| 7,210,583 B2 * | 5/2007 | Walpus et al. ................ 235/380 |
| 7,311,263 B2 * | 12/2007 | Eichler et al. ................ 235/492 |
| 7,344,062 B2 * | 3/2008 | Greene et al. ................ 235/375 |
| 7,607,575 B2 * | 10/2009 | Kingsborough et al. ..... 235/380 |
| 2004/0089706 A1 * | 5/2004 | Hill et al. ...................... 235/375 |
| 2004/0139318 A1 * | 7/2004 | Fiala et al. .................... 713/165 |
| 2005/0139653 A1 * | 6/2005 | Zettler ........................... 235/380 |
| 2006/0200362 A1 * | 9/2006 | Paciolla et al. ................... 705/1 |
| 2007/0090184 A1 * | 4/2007 | Lockwood et al. ........... 235/380 |
| 2008/0217415 A1 * | 9/2008 | Royer ........................... 235/493 |

* cited by examiner

*Primary Examiner* — Thien T Mai
(74) *Attorney, Agent, or Firm* — Young & Thompson

(57) ABSTRACT

A method of packaging financial transaction instruments includes preparing a batch of cards, where each card is provided with a first piece of machine readable information, and where the cards in the batch are in an order. A batch of packaging blanks is prepared, where each packaging blank is provided with a second piece of machine readable information. Each packaging blank is provided with a third piece of machine readable information, which is recorded onto a magnetic stripe carried by the packaging blank. A card is picked from a first ordinal position in the batch of prepared cards. A packaging blank is picked from a position, corresponding to the first ordinal position, in the batch of prepared packaging blanks. The picked card in the picked packaging blank is enclosed if and only if a matching condition is verified between the first and second pieces of information is verified.

13 Claims, 12 Drawing Sheets

| card number | packaging number | magnetic stripe data |
|---|---|---|
| AAAAAAAAAAAAAAAA | BBBBBBBBBBBBBBBB | CCCCCCCCCCCCCCCC |
| ... | ... | ... |
| XXXXXXXXXXXXXXXX | YYYYYYYYYYYYYYYY | ZZZZZZZZZZZZZZZZ |

FIG. 6

METHOD OF PACKAGING FINANCIAL TRANSACTION INSTRUMENTS, PARTICULARLY STORED VALUE CARDS

FIELD OF INVENTION

The present invention relates to a packaging method and more particularly to the packaging of financial transaction instruments, such as e.g. stored value cards.

BACKGROUND OF INVENTION

Stored value cards of different kinds, such as gift cards, are commonly used as a means of payment against a pre-paid account. Used in this way, they are referred to as debit cards.

Debit cards are commonly printed and sold with a face value, say $25. The purchaser pays for the card, which is then good for 25 dollars' worth of the goods or services promoted by the card. When the card is used to make a purchase, the card number is used to identify an associated account. If sufficient funds remain in the account, the account is debited with the value of the purchase, otherwise the purchase is refused. It is becoming increasingly common to sell such cards from open retail spaces. Cards sold in this way are 'activated' (i.e. associated to an account having a positive balance) only after they have been paid for. Prior to sale, they are associated with an inactive account: one that has, in effect, a balance of zero. This arrangement has two significant advantages: first, the retailer does not have to pay for the card until it is sold; and second, there is no incentive to steal cards on display, as they have no value.

There are a several ways of providing for the activation of accounts. Patent application WO 97/39 899 describes a packaging system where the code required to initiate the activation procedure is held on a magnetic stripe on the card. The card is packaged in such a way as to leave its magnetic stripe exposed, so that it can be read by point of sales equipment without removing the card from the packaging. The packaging is arranged to hide the card number and Personal Identification Number (PIN) that will be used for carrying out transactions once the card has been activated. Any attempt to view these numbers surreptitiously, leaves a trace on the packaging. The sales clerk checks the integrity of the packaging before initiating the authorization procedure. There are two disadvantages of this system: first, the packaging is complex and relatively expensive to produce, and second, the exposed magnetic stripe is easily damaged during transport and handling.

These disadvantages are partially addressed by US patent application No. 2002/043 558, which describes a packaging system with an aperture through which a number carried on the card, possibly the card number, is visible. An exterior surface of the packaging is provided with a magnetic stripe. The card is enclosed and sealed inside the packaging, and then an encoding derived from the exposed number is written onto the magnetic stripe. This has the advantage that the card is protected from damage during transport and handling, but it has the disadvantage that the card number is exposed to view.

US patent application No. 2006/0273153 discloses a secure packaging system for stored value cards, where no part of the card is visible through the sealed packaging. However, the '153 application does not disclose a practical system for bringing cards and packaging together. High speed production systems need to be able to package thousands of cards per hour. There is a need for a method of bringing cards and packaging together that reconciles the speed and reliability requirements of a modern production environment.

SUMMARY OF THE INVENTION

A method of packaging financial transaction instruments comprising the following steps is provided:

1.a). a step of preparing a batch of cards, where each card is provided with a first piece of machine readable information, and where the cards in the batch are in an order, 1.b). a step of preparing a batch of packaging blanks, where each packaging blank is provided with a second piece of machine readable information, 1.c). a step where each packaging blank is provided with a third piece of machine readable information, which is recorded onto a magnetic stripe carried by said packaging blank, and where the third piece of information is at least part of an activation code of a corresponding card, and where the packaging blanks are ordered, such that the packaging blank at a given ordinal position is the packaging blank associated with the card at a corresponding ordinal position in the card order, 1.d). a step of picking a card from a first ordinal position in the batch of prepared cards, 1.e). a step of picking a packaging blank from a position, corresponding to said first ordinal position, in the batch of prepared packaging blanks, 1.f). a step of reading the first piece of information from the card, and the second piece of information from the packaging blank, 1.g). a step of verifying a matching condition between the first piece of information and the second piece of information, 1.h). a step of enclosing the picked card in the picked packaging blank if and only if said matching condition is verified.

These steps are not necessarily processed in the order just mentioned. Step c) may for instance be implemented at various stages, as described below.

Cards and packaging are uniquely associated: a given packaging is prepared for, and only for, a given card. The cross check between the packaging identifier and the card identifier thus advantageously occurs exactly at the point where the card and packaging are brought together.

As the cards and packaging are at least within a batch uniquely associated, the method guarantees that this association is preserved, whilst at the same time allowing adequate throughput.

Furthermore, thanks to the proposed verification, packaging blanks do not have to be prepared on the same production line that is used to join cards and packaging, which allows more flexible production scheduling.

The first piece of information is for instance an identification number, unique at least within the batch of cards.

In a possible embodiment, the package blank is folded before the step of recording the third piece of information, and opened before the step of enclosing the picked card on the picked packaging blank.

The prepared packaging blank may e.g. be opened after the step of recording the third piece of information.

In a preferred embodiment second piece of information is in the form of a bar code, which is an interesting practical way to unambiguously identify the card for which the packaging blank is prepared.

In an alternative embodiment, the step of recording the third piece of information is carried out after the step of sealing the folded packaging blank. The process is thus flexible.

In a possible embodiment, during the step of enclosing the card in the folded packaging blank, the card is fully enclosed in the folded and sealed packaging blank.

Thanks to this solution, the service-access information carried on the card may be unviewable after the packaging blank has been folded and sealed.

All the information carried on the card may even be unviewable after the packaging blank has been folded and sealed.

In the same order of thinking, the third piece of information is not viewable after the packaging blank has been folded and sealed.

The third piece of information may also be positioned in such a manner that it is destroyed by opening the sealed package.

According to a possible embodiment, the second piece of information (used for checking the card and packaging blank match each other) is the third piece of information (relating to activation of the card).

A further advantage of the proposed embodiments is that the same edge, or fold line, on the packaging is used to align the packaging with the recording apparatus during the recording of the activation code on the magnetic stripe, as is used to align the packaging with the point of sale reader when the activation code is read at the point of sale.

It is also proposed to render the service access information unviewable after the packaging has been folded and sealed.

BRIEF DESCRIPTION OF THE DRAWINGS

The drawings are not to scale. They are intended to be illustrative, not limiting. Where the same element appears in more than one drawing, for example the magnetic stripe, which appears in FIGS. 1, 2, 3, 4 and 5, it is numbered similarly, in this case: 102, 202, 302, 402 and 502.

FIG. 6 is a table showing the structure of the records used in the preparation of a batch of packaging blanks, according to the present invention.

FIG. 11 B is a side view of a third embodiment of a packaging blank.

TERMINOLOGY

Figure 1:
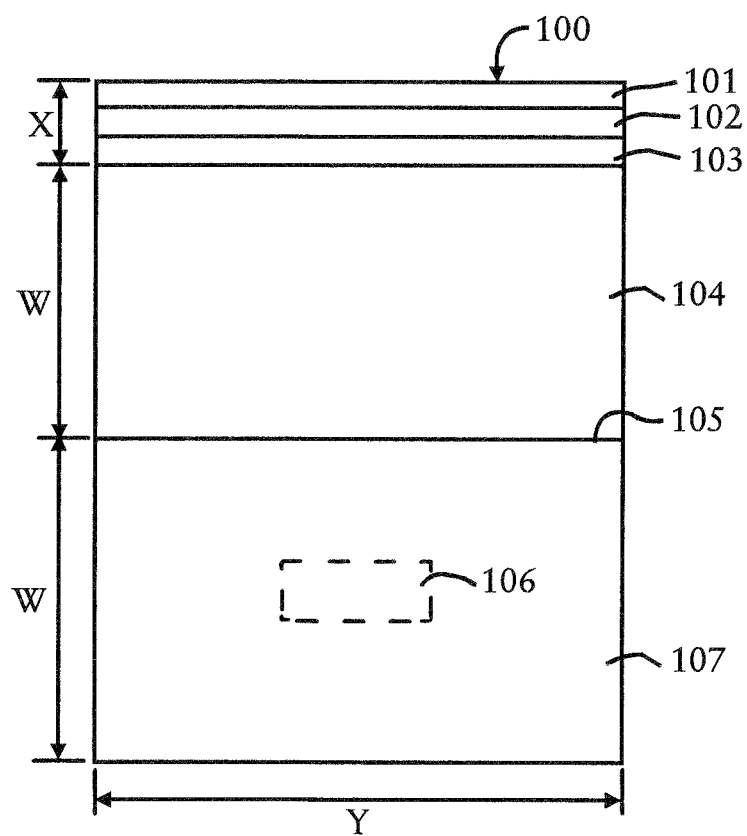
FIG. 1 shows the exterior surface of a first embodiment of a packaging blank.
Figure 2:
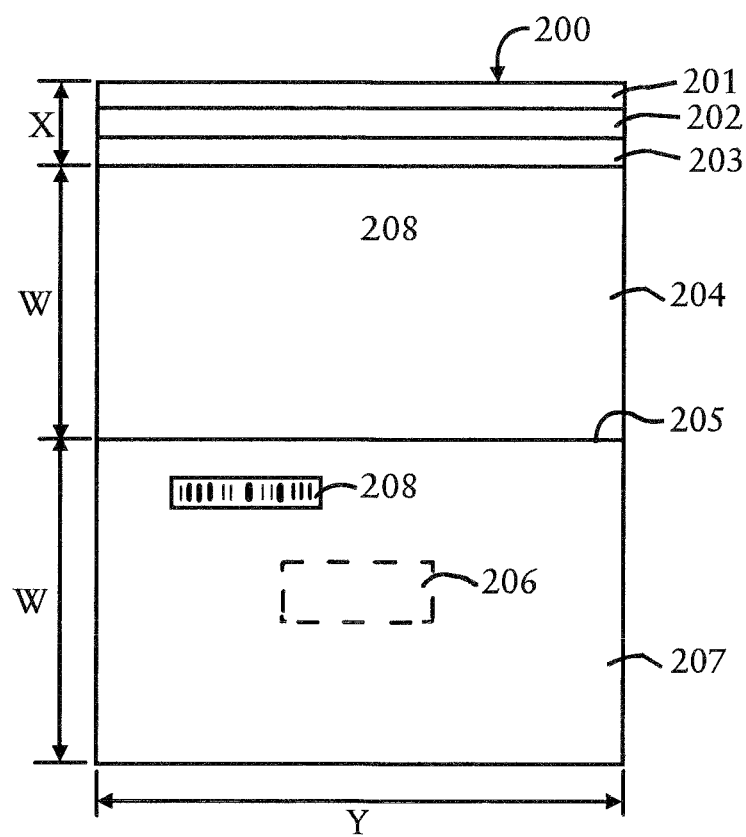
FIG. 2 shows the exterior surface of a first embodiment of the packaging according to the present invention, after encoding the magnetic stripe, before attaching the card, before folding and before sealing.
Figure 3:
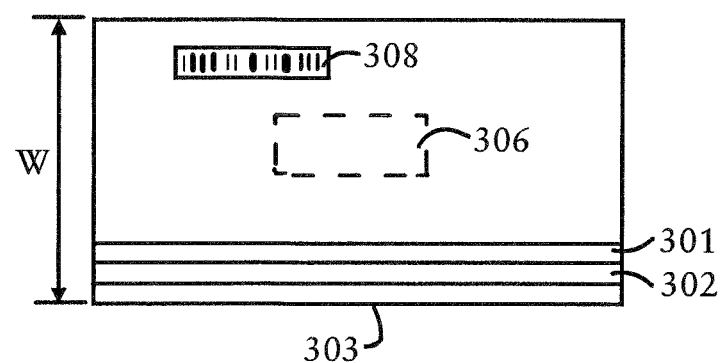
FIG. 3 shows the packaging of FIG. 2 after folding.

The present invention relates to a method of packaging financial transaction instruments, such as e.g. stored value cards. In this respect, it may be noted that a transaction account can be thought of as a space associated with an identifier. The identifier will normally be an account number, and the space will normally be some kind of computer storage structure. The space may have other attributes, such as the name of the account holder, or the state of the account, active or inactive, for example. The space stores records of monetary transactions, or at least the running balance of the account, a record is at least a monetary value, but may include other information such as the date, time and place that the transaction took place. The financial transaction instrument is a physical representation of a transaction account. Typical examples of financial transaction instruments are telephone cards, gift cards, credit cards, and debit cards, i.e. generally speaking stored value cards. In the context of the description below, the magnetic stripe data 603 which is recorded onto the magnetic stripe 302 is understood to contain part or all of the information required to identify and activate the transaction account associated with the financial transaction instrument enclosed in the packaging. The magnetic stripe data is typically used, possibly with complementary data such as a merchant identification number or a complementary key or both, to activate a transaction account, in which case the data is referred to as an activation code.

Once an account has been activated, the financial transaction instrument allows its holder to purchase goods or services up to the value represented in the associated account. In order to make a payment, the holder must provide at least enough information to allow that account to be identified. In many cases, additional information, such a personal identification number, will be required. Whatever the case, this information is referred to as service-access information. Typically, some or all of the service-access information is held, in one form or another, on the financial transaction instrument.

DETAILED DESCRIPTION OF THE INVENTION

A first embodiment of the method of the present invention is described below. The description is with reference to FIGS. 1, 2, 3, 6, 7, 8 and 9.

The packaging material is preferably card stock, but it may be any other suitable material or composite. The card stock is cut to form the package blank 100. The package blank, preferably rectangular in outline, is divided into three parts: the top flap 100, the top panel 104, and the bottom panel 107. Exemplary dimensions (expressed in millimeters, "mm") for the packaging blank 100 are as follows:

X, the height of the top flap 101 is, for example, approximately 25 mm.

W, the height of the top and bottom panels 104 and 107 is, for example, approximately 94 mm.

Y, the width of the packaging blank 100 is, for example, approximately 127 mm.

The thickness of the card stock is, for example, approximately 0.25 mm.

The packaging blank is provided with a magnetic stripe 102, which may be applied by any of the methods well known in the art. The procedure for recording data onto the magnetic stripe is described in detail below. The area 106 is the area on the interior surface of the package blank onto which the card is placed during the packaging process, it may be adhesively bonded to the package or left free to move within the sealed package.

Cards and packaging are prepared in batches. A batch of cards is placed in a known sequence in a dispenser 901, preferably a hopper feeding system (see FIG. 9). The sequence of cards in the dispenser reflects the sequence of records in a table 600 (to be further described later), such that the first card in the dispenser corresponds to the first card in the table, and the next card in the dispenser corresponds to the next card in the table. This sequence is referred to hereafter as the 'packaging sequence'. The packaging sequence is defined with reference to the table; furthermore, the cards in a batch are ordered, there is a first, second, third, and so on, up to a last card. A batch of cards retains the same order throughout the packaging process.

According to a possible alternative embodiment, it is possible to avoid the use of a table: the cards are ordered in a sequence corresponding to a sequence of the packaging blanks, and the cards and packaging blanks contain information that can be matched without reference to a table, as described below.

A packaging blank is prepared for a particular card in order to ensure coherence between data to be held by the packaging blank (on its magnetic stripe) and data held by the card, as further explained below. It is thus proposed that the prepared packaging blanks are ordered such that the packaging blank for a card in a given ordinal position, for example, the seventeenth card, is to be found within the batch of packaging blanks at a corresponding position, which may be the same ordinal position, in this example, the seventeenth packaging blank.

A batch of prepared packaging blanks is placed, in packaging sequence, in a dispenser 908. This batch is prepared according to the following procedure, described with reference to FIGS. 7 and 1.

In the initial state, START, the next record in table 600 is the first record. A machine control computer 1005 reads the next record 604 from table 600, this record thus becoming the 'current record'. At step 702, a packaging blank is fed from a dispenser 1001 to a folding station 1002, where it is folded, step 703. The folding station may, for example, be a plough folder. The folding sequence, step 704, is as follows:

The bottom panel 107 is folded along the line 105 towards the interior surface of the top panel 104. The top flap 101 is then folded along the line 103 towards the exterior surface.

The folded package blank 300 is fed into an encoding station 1003, which is connected via a data line 1010 to the computer 1005. The feed system ensures that the line 303 is firmly registered against a guide or datum 1009, right through from its entry into the encoding station to its exit from the bar code read-back station 1007. Rollers, not shown, ensure that the package blank is advanced at the appropriate speed for encoding the magnetic stripe 302. The magnetic stripe data 603 from the current record is read from table 600 and written (or recorded) onto the magnetic stripe 302, step 704. The magnetic stripe data includes at least part of the activation code. This part may, for example, be a cryptographic code, which when combined with further information, allows the account associated with the card to be activated. A particularity of this arrangement is that the edge on the sealed package that is used to guide the magnetic stripe while the magnetic stripe is being read by a point of sale card-reader, is the same edge, namely the fold line 303, that is used to guide the magnetic stripe while it is being recorded during the preparation of the packaging blank. This reduces the number of packages that have to be rejected due to read failures at the point of sale. The package blank is fed from the encoding station 1003 into a printing station 1004, the packaging number 602 from the current record is printed as a bar code onto the package blank 308, step 705. Other graphical data, for example, a product code, may be printed during this step. The packaging number is printed as a bar code, but it may equally be printed as another kind of graphical representation. The package blank is fed from printing station 1004 into the magnetic stripe read-back station 1006. The magnetic strip is read and the value read is compared with the value of the magnetic stripe data 603 in the current record (step 706). If the two values are not identical, the process is halted, otherwise it continues at step 707. The package blank is fed from the magnetic stripe read-back station 1006 to the bar code read-back station 1007. The bar code is read and the value is compared with the value of the packaging number 602 in the current record. If the two values are not identical, the process is halted, otherwise it continues at step 708. The two read-back checks 706 and 707 are fidelity checks meant to show up any inconsistency in the quality of the magnetic stripe or bar code. The finished package blank is fed via rollers to an output hopper 1011, step 708. Alternatively it may be fed onto an output conveyor, and from there, to the process for joining the cards to the prepared packaging blanks, which is described below.

Figure 4:
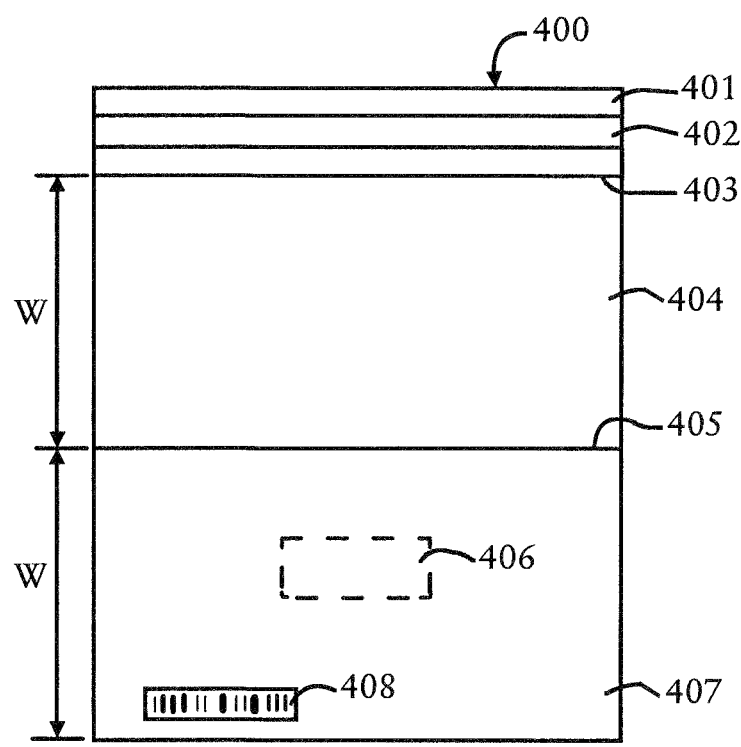
FIG. 4 shows the exterior surface of a second embodiment of the packaging according to the present invention, after encoding the magnetic stripe, before attaching the card, before folding and before sealing.
Figure 5:
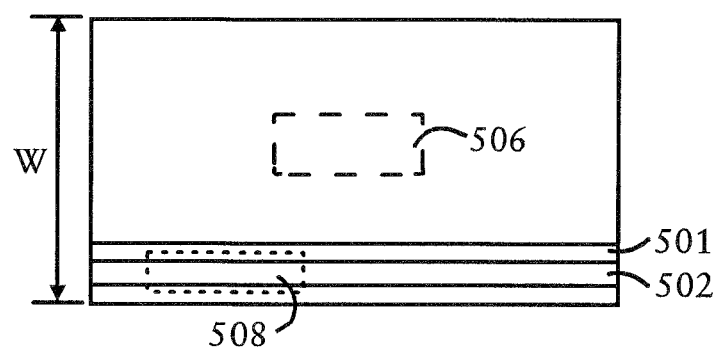
FIG. 5 shows the packaging of FIG. 4 after attaching the card, after folding and after sealing.
Figure 7:
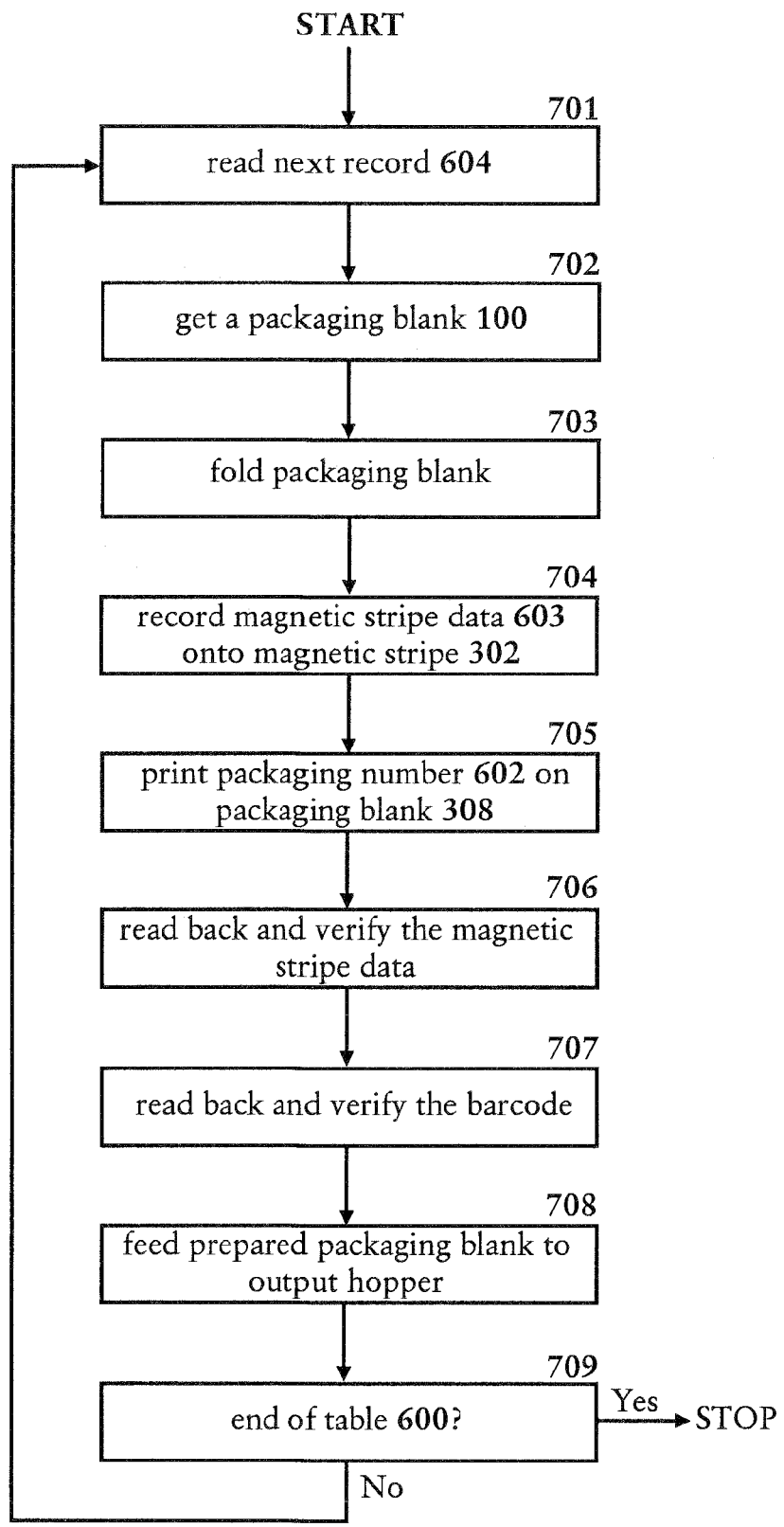
FIG. 7 is a flowchart showing a method according to the present invention of preparing a batch of packaging from packaging blanks, prior to joining the prepared packaging to the personalized cards.
Figure 7A:
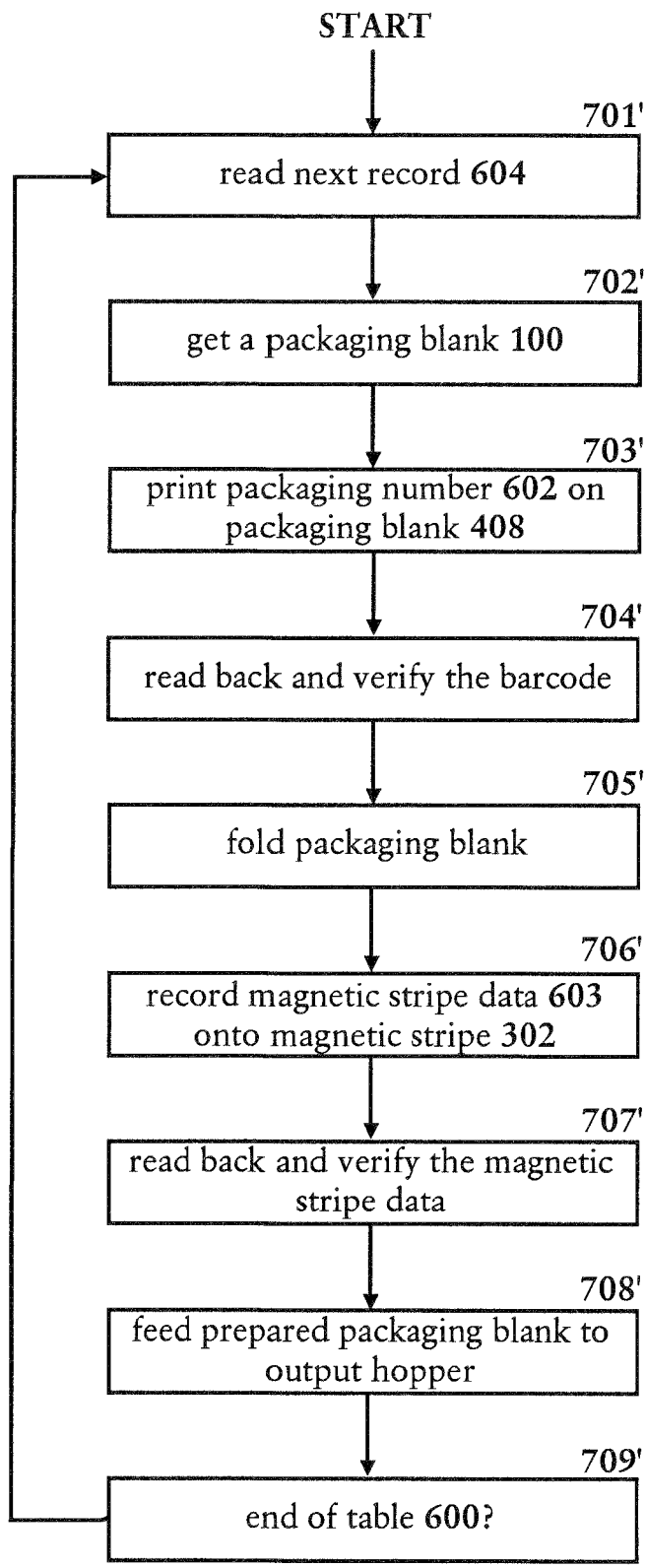
FIG. 7A is a flowchart showing an alternative method when the second embodiment of the packaging blank is used.

In a second embodiment, the printing station and the bar code read-back station, are placed directly after the dispenser in that order, and before the folding station. The graphical representation of the packaging number is then printed in a different position, as shown at 408 in FIG. 4. The package blanks are then prepared according to the procedure shown in FIG. 7A. This has the advantage that it is hidden when the packaging is sealed, as shown at 508 in FIG. 5. By using a suitable adhesive when sealing the package, it is possible to ensure that the packaging number is unusable after the package has been opened, which eliminates any ill-intentioned use of the packaging number. Hiding the bar code from view on the sealed package also leaves greater scope for a pleasing graphic design on the exterior surface of the package.

Figure 11A:
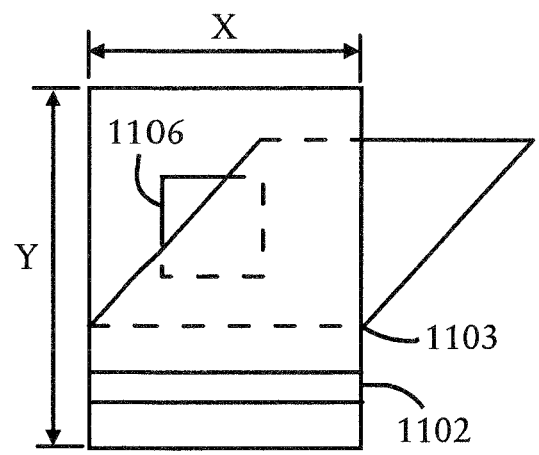
FIG. 11 A is a front view of a third embodiment of a packaging blank.
Figure 11B:
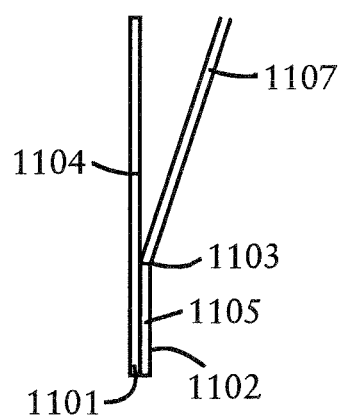

In a third embodiment shown in FIGS. 11A and 11B, the packaging blank 1100 is formed from a back panel 1101 and a front panel 1107. The front panel is provided with a hinge, preferably formed by scoring or pre-folding along the line 1103. The inner surface of the back panel 1104 is attached to the inner surface of the hinge support 1105, preferably by means of an adhesive. The packaging blank is provided with a magnetic stripe 1102. The area 1106 is the area on the inner surface of the back panel to which the card is attached, or within which it is placed. As an alternative, the inner surface of the front panel could be used instead. Exemplary dimensions (expressed in millimeters, "mm") for the packaging blank 1100 are as follows:

X, the width of the package blank 1100 is, for example, approximately 100 mm.

Figure 10:
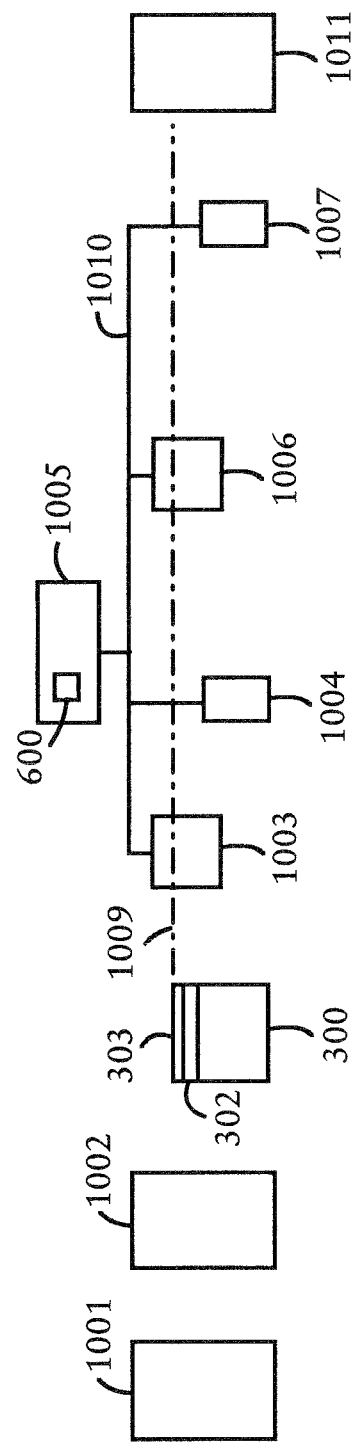
FIG. 10 shows a possible embodiment of an apparatus for preparing package blanks.

Y, the height of the package blank 1100 is, for example, approximately 140 mm In this third embodiment, a batch of packaging blanks is prepared as described for the first embodiment except that step 704, in which the packaging blank is folded, is omitted and there is no folding station 1002 in the apparatus for preparing packaging blanks (FIG. 10).

Figure 8:
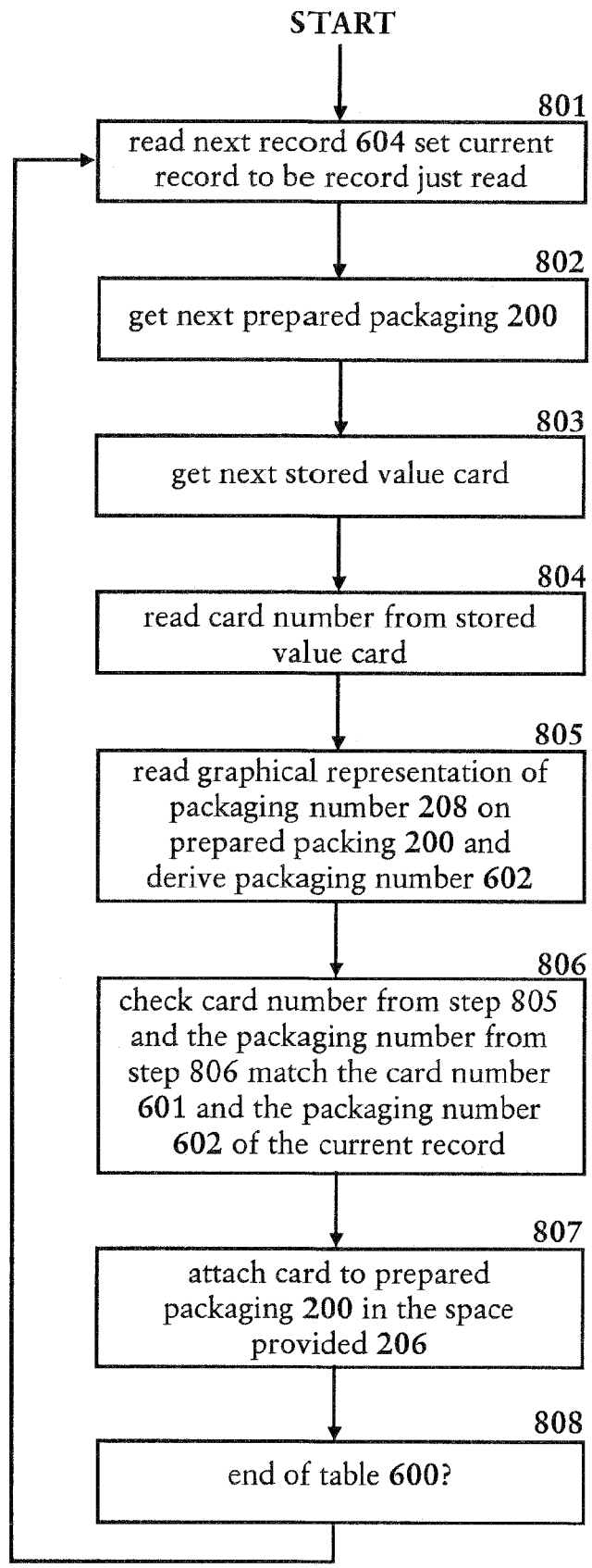
FIG. 8 is a flowchart showing a method according to the present invention of joining a batch of stored value cards to a batch of prepared packaging.
Figure 9:
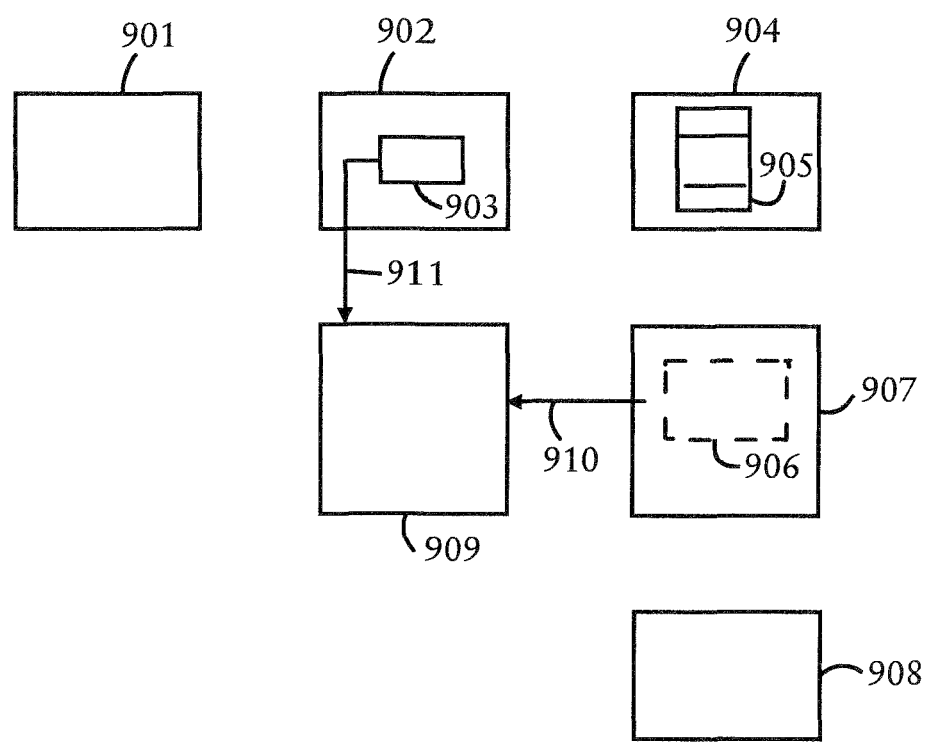
FIG. 9 shows a possible embodiment of an apparatus for joining prepared packaging blanks and cards.

Whatever the embodiment of the three embodiments just described, the process continues as now described with reference to FIGS. 8 and 9. The two dispensers mentioned above, 901 and 908 for the cards and packaging blanks respectively, are loaded at this stage of the process. The process of joining the cards to the prepared packaging blanks begins as follows.

A machine control computer 909, which may be independent or linked to the machine control computer 1005, reads the next record 604 from table 600, this record becomes the 'current record', step 801. A prepared packaging blank is fed out of, or picked from the dispenser 908, unfolded by means of arms provided with suction cups, and conveyed by means of rollers and guides, its interior surface uppermost, to the stop point 907, step 802. (Where the first or second embodiment of the prepared packaging blanks is used, the dispenser 908 includes a mechanism for unfolding the prepared packaging blanks. Where the third embodiment of the prepared packaging blanks is used, this mechanism is not required.)

A card is conveyed, or picked from the dispenser 901, by means of rollers and guides, to the stop point 902, step 803. A first reader 903 transmits the card number to the machine control computer 909 via the data line 911, step 804.

The card number is any identification number that is unique at least within the batch of cards. It may be in a variety of different forms, for example, embossed characters on the surface of the card, optical characters on the surface of the card, characters recorded on a magnetic stripe on the surface of the card, characters stored in a microcircuit embedded in the card.

A second reader 906, situated to allow it to read the bar code from underneath package blank, transmits the graphical representation of the packaging number 208 to the machine control computer via the data line 910, the machine control computer derives the packaging number from this data, step 805.

The machine control computer checks that the card number from step 804 and the packaging number from step 805 match the card number 601 and the packaging number 602 of the current record. Generally speaking, there is a check to verify that the number read from the card and the packaging number read from the packaging blank match each other. In the alternative embodiment mentioned above where no table is used, this check could consist in verifying that the numbers read are linked by a given function, e.g. that the numbers are identical (the function then being the identity function). If they do, the prepared packaging blank and the card are conveyed, by means of rollers and guides, to the card joining station 904; otherwise the process is halted, step 806.

This cross-check or verification, directly at the point where the card is joined to its corresponding package, reduces the probability of a card-to-package matching error to practically zero.

It would, of course, be possible to obtain the same result by cross checking the card number with the magnetic stripe data from the package blank, in which case the bar code could be dispensed with.

The card is then attached to, or placed in, the prepared packaging, step 807. The card and prepared packaging are then conveyed to a folding station, not shown. Where the first or second embodiment of the prepared packaging blanks is used, the folding sequence is as follows:

The bottom panel 107 is folded along the line 105 towards the interior surface of the top panel 104. A seal is made, preferably by means of an adhesive, between the interior surfaces of the top and bottom panels. The top flap 101 is folded along the line 103 towards the exterior surface of the now sealed bottom panel. A seal is made, preferably by means of an adhesive, between the interior surface of the top flap and the exterior surface of the bottom panel.

Where the third embodiment of the prepared packaging blanks is used, an adhesive, which may be heat or pressure sensitive, is disposed on the inner surface of the back panel 1104. The front panel 1107 is then closed against the back panel 1104 and sealed by applying pressure or heat or both.

What is claimed is:

1. A method of packaging financial transaction instruments performed by an apparatus for preparing and joining packaging blanks and cards, the method comprising the following steps:

a) a step of preparing a batch of cards in a dispenser, wherein each card has a first piece of machine readable information, and wherein the cards in the batch are in a first order;

b) a step of preparing a batch of packaging blanks, wherein a recording device provides each packaging blank with a second piece of machine readable information;

c) a step wherein another recording device provides each packaging blank with a third piece of machine readable information which is recorded onto a magnetic stripe carried by said packaging blank such that the third piece of information is destroyed upon opening the packaging blank, the third piece of information being at least part of an activation code of a corresponding card, wherein the packaging blanks are ordered in a second order, such that when a first packaging blank is at an ordinal position preceding an ordinal position of a second packaging blank in said second order, a first card corresponding to the first packaging blank is at an ordinal position preceding an ordinal position of a second card corresponding to the second packaging blank in the first order;

d) a step of picking, by way of a card picking device, a card from a first ordinal position in the batch of prepared cards;

e) a step of picking, by way of a packaging blank picking device, a packaging blank from a position, corresponding to said first ordinal position, in the batch of prepared packaging blanks;

f) a step of reading via a card reader the first piece of information from the card, and the second piece of information from the packaging blank, the second piece of information being in the form of a bar code that identifies the card for which the packaging blank is prepared;

g) a step of verifying via a controller device a matching condition between the first piece of information and the second piece of information to check that the card corresponds to the packaging blank; and h) a step of enclosing the picked card in the picked packaging blank via a joining device if and only if said matching condition is verified, wherein the package blank is folded before step c, and opened before step h, and wherein the third piece of information is not viewable after the packaging blank has been folded.

2. The method of claim 1, wherein the first piece of information is an identification number, unique at least within the batch of cards.

3. The method of claim 1, wherein the prepared packaging blank is opened after step c.

4. The method of claim 1, wherein step c is carried out after step h.

5. The method of claim 4, wherein the second piece of information is in the form of a bar code, which identifies the card for which the packaging blank is intended.

6. The method of claim 1, wherein, during step h, the card is fully enclosed in the folded packaging blank.

7. The method of claim 6, wherein a service-access information carried on the card is unviewable after the packaging blank has been folded and sealed.

8. The method of claim 7, wherein all the information carried on the card is unviewable after the packaging blank has been folded and sealed.

9. The method of claim 1, wherein an edge of the packaging configured to align the packaging with the recording apparatus during step c is configured to align the packaging with a reader of the third piece of information.

10. The method of claim 1, wherein said corresponding ordinal position is identical to said given ordinal position.

11. The method of claim 1, wherein the second piece of information and the third piece of information are a same piece of information.

12. The method of claim 5, wherein, during step h, the card is fully enclosed in the packaging blank.

13. The method according to claim 1, further comprising:
accessing, via a control computer, a computer-readable table having data stored therein associating each card of the batch with a packaging blank, wherein the first order corresponds to the order of the cards in the table and the second order corresponds to the order of the packaging blanks in the table.

\* \* \* \* \*